UNITED STATES PATENT OFFICE.

ALEXANDER BOAG, OF GRAND RAPIDS, MICHIGAN.

IMPROVEMENT IN MARBLE-CEMENTS.

Specification forming part of Letters Patent No. 167,979, dated September 21, 1875; application filed August 4, 1875.

*To all whom it may concern:*

Be it known that I, ALEXANDER BOAG, of Grand Rapids, in the county of Kent and State of Michigan, have invented a certain compound called Marble-Cement, of which the following is a specification:

To prepare the cement I calcine and desulphurize rock-gypsum in the following manner: I place the rock-gypsum in a furnace or kiln, and calcine it from three to four hours. During the last hour, at intervals of about ten minutes, I open the furnace-door for a few minutes and admit air to the heated rock. The oxygen of the air mingling with the sulphurous vapors oozing from the pores of the rock at a high temperature causes them to ignite and be consumed, burning with a brilliant blue flame. This process is repeated until the rock is entirely desulphurized. The calcined and desulphurized rock is then pulverized or ground fine in a mill, and to every one hundred pounds I add one pound of powdered alum, one-half pound of saltpeter, and a half pound of sulphate of zinc, all in a powdered state, and thoroughly incorporate the chemicals with the desulphurized gypsum by rolling them in a mixing-box, when the compound is ready for use.

The cement so prepared can be tempered with water to the consistency of mortar, and applied to walls either directly or as a finishing-coat over common plaster, and when dry will present a hard, marble-like surface that will not be affected by the elements; or the said cement may be used as a basis for the manufacture of artificial marble.

The desulphurization of the gypsum by the above-described process frees the cement from the yellow stains which would otherwise manifest themselves on the surface of the marble manufactured from it.

The purpose of the alum in the compound is to harden it, while the saltpeter acts as a hardening and bleaching agent; but the sulphate of zinc not only bleaches the compound, but imparts to the surface of the finished material a smooth, glossy luster.

What I claim as my invention is—

The herein-described marble-cement, made by combining with gypsum, calcined and desulphurized, as set forth, alum, saltpeter, and sulphate of zinc, substantially in the proportions and manner specified.

ALEXANDER BOAG.

Witnesses:
 H. F. EBERTS,
 H. S. SPRAGUE.